US005388326A

United States Patent [19]

Beeson et al.

[11] Patent Number: 5,388,326

[45] Date of Patent: Feb. 14, 1995

[54] SELF ALIGNING ORIFICE CONSTRUCTION FOR THERMAL INK-JET PRINTHEADS

[75] Inventors: Robert R. Beeson, Corvallis; Paul H. McClelland, Monmouth; Donald B. Ouchida, Corvallis, all of Oreg.

[73] Assignee: Hewlett-Packard Corporation, Palo Alto, Calif.

[21] Appl. No.: 118,277

[22] Filed: Sep. 7, 1993

[51] Int. Cl.[6] .......................... H05B 3/00; G01D 9/00; B32B 31/00

[52] U.S. Cl. ..................................... 29/611; 29/890.1; 347/63; 156/276; 156/293; 156/298

[58] Field of Search ............... 29/611, 890.1; 156/276, 156/291, 293, 298; 347/63, 65, 47

[56] References Cited

U.S. PATENT DOCUMENTS 4,612,554 9/1986 Poleshuk ............................... 347/65

FOREIGN PATENT DOCUMENTS 60-64854 4/1985 Japan ..................................... 347/63
60-206654 10/1985 Japan ..................................... 347/65

*Primary Examiner*—P. W. Echols

[57] ABSTRACT

A method is provided for assembling thermal ink-jet printheads. The method comprises: (a) providing a circuit layout comprising a first substrate, a plurality of conductive traces thereon in a pre-selected pattern, and a plurality of openings through the substrate defining ink-jet nozzles; (b) providing a die layout comprising (1) a plurality of resistors, each resistor formed on a second substrate and matched to an opening and (2) a plurality of channels formed in a barrier material and matched to a portion of the plurality of conductive traces; (c) interlocking the plurality of conductive traces with the plurality of channels to align each resistor with a respective one of the openings; and (d) laminating those portions of the first substrate that contact the barrier to the barrier so as to bond the two layouts together. In one embodiment, the resistors are each formed in a well defined in a layer of the barrier material already on the substrate, which is extended to encompass the resistors. In a second embodiment, the barrier material is omitted, and the resistors are simply formed on the substrate. In either case, the barrier material comprises a photopolymerizable material and each resistor matched to a nozzle forms a firing chamber. The advantage of the invention over what has been done before is the ability to utilize photodefinable features on the two primary components so as to provide both performance and cost advantages.

6 Claims, 5 Drawing Sheets

SELF ALIGNING ORIFICE CONSTRUCTION FOR THERMAL INK-JET PRINTHEADS

TECHNICAL FIELD

The present invention relates to thermal ink-jet pens, and, more particularly, to an improved construction of the printheads used in such pens.

BACKGROUND ART

Thermal ink-jet pens comprise a reservoir of ink and a printhead for expelling droplets of the ink onto a print medium, such as paper. The printhead includes resistor elements located in firing chambers fed with a supply of ink from a plenum chamber, which is fluidically connected to the ink reservoir. Resistor elements are selectively heated to expel the droplets of ink from the firing chamber through an orifice in an orifice plate.

During fabrication of the printhead, there are a number of elements in the process that either are expensive or have the potential to result in an inferior product. For example, complex vision systems are currently required to align the orifice plate to the resistors during assembly of the printhead. The better the alignment, the better the print quality. A simple method of alignment, coupled with a high degree of precision, would be desirable.

Another recurring problem is adhesion of the orifice plate to the substrate, on which the resistors are formed. Delamination can occur from residual stresses. A present goal is improved adhesion of the orifice plate to the substrate.

While current manufacturing techniques offer marginal alignment for consistent print quality, they are costly. Thus, a need remains for an improved process for aligning the orifice plate so that the orifi therein line up with the resistors.

DISCLOSURE OF INVENTION

In accordance with the invention, a method is provided for assembling thermal ink-jet printheads. The method comprises:

(a) providing a circuit layout comprising a first substrate, a plurality of conductive traces thereon in a pre-selected pattern, and a plurality of openings through the substrate defining ink-jet nozzles;

(b) providing a die layout comprising (1) a plurality of resistors, each resistor formed on a second substrate and matched to an opening and (2) a plurality of channels formed in a barrier material and matched to a portion of the plurality of conductive traces;

(c) interlocking the plurality of conductive traces with the plurality of channels to align each resistor with a respective one of the openings; and (d) laminating those portions of the first substrate that contact the barrier to the barrier so as to bond the two layouts together.

The barrier material comprises a photopolymerizable material.

In one embodiment, the resistors are each formed in a well defined by a wall of the barrier material already on the substrate, which is extended to encompass the resistors. In a second embodiment, the barrier material is omitted, and the resistors are simply formed on the substrate. In either case, the barrier material comprises a photopolymerizable material and each resistor matched to a nozzle forms a firing chamber.

The advantage of the invention over what has been done before is the ability to utilize photodefinable features on the two primary components so as to provide both performance and cost advantages.

Figure 1:
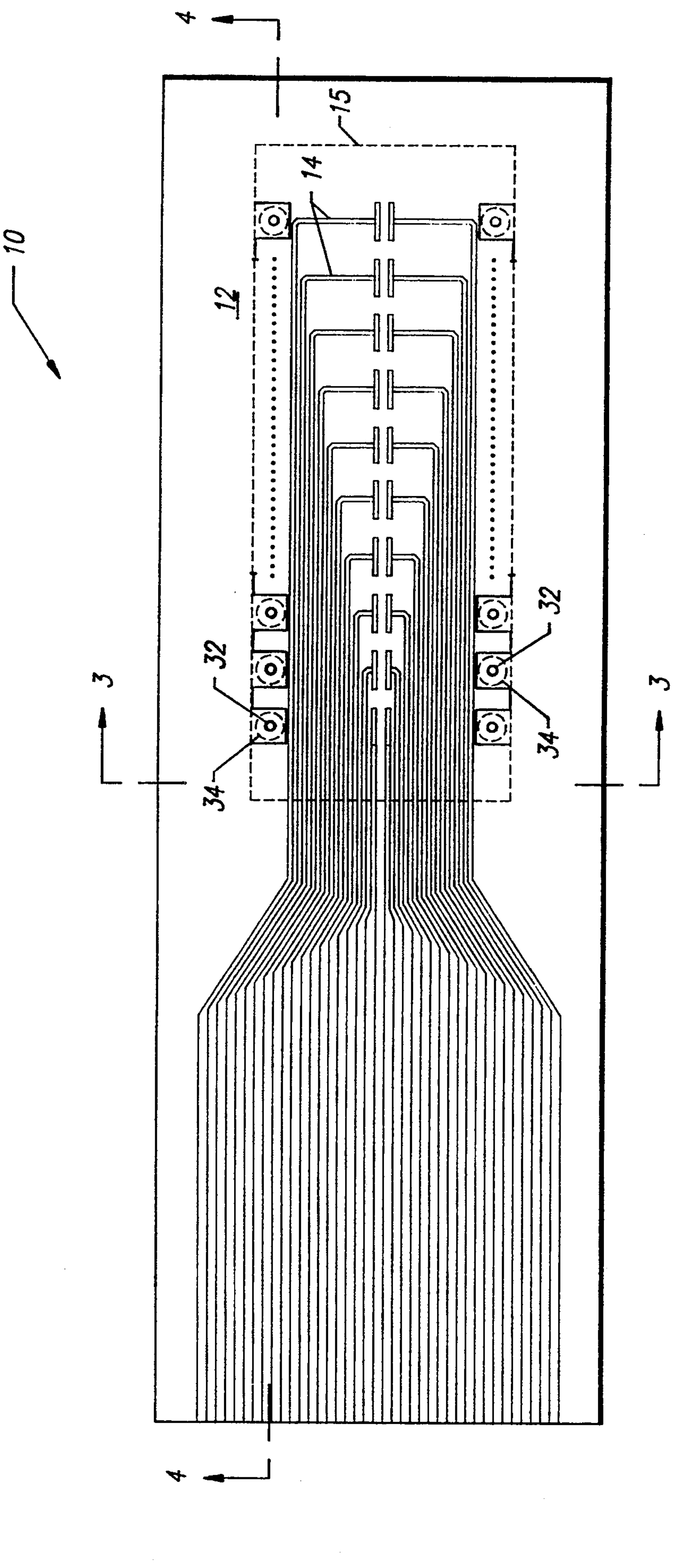
FIG. 1 is a top plan view of a tab circuit layout, a portion of which is to be recessed into a pre-configured layer in accordance with the invention.
Figure 2:
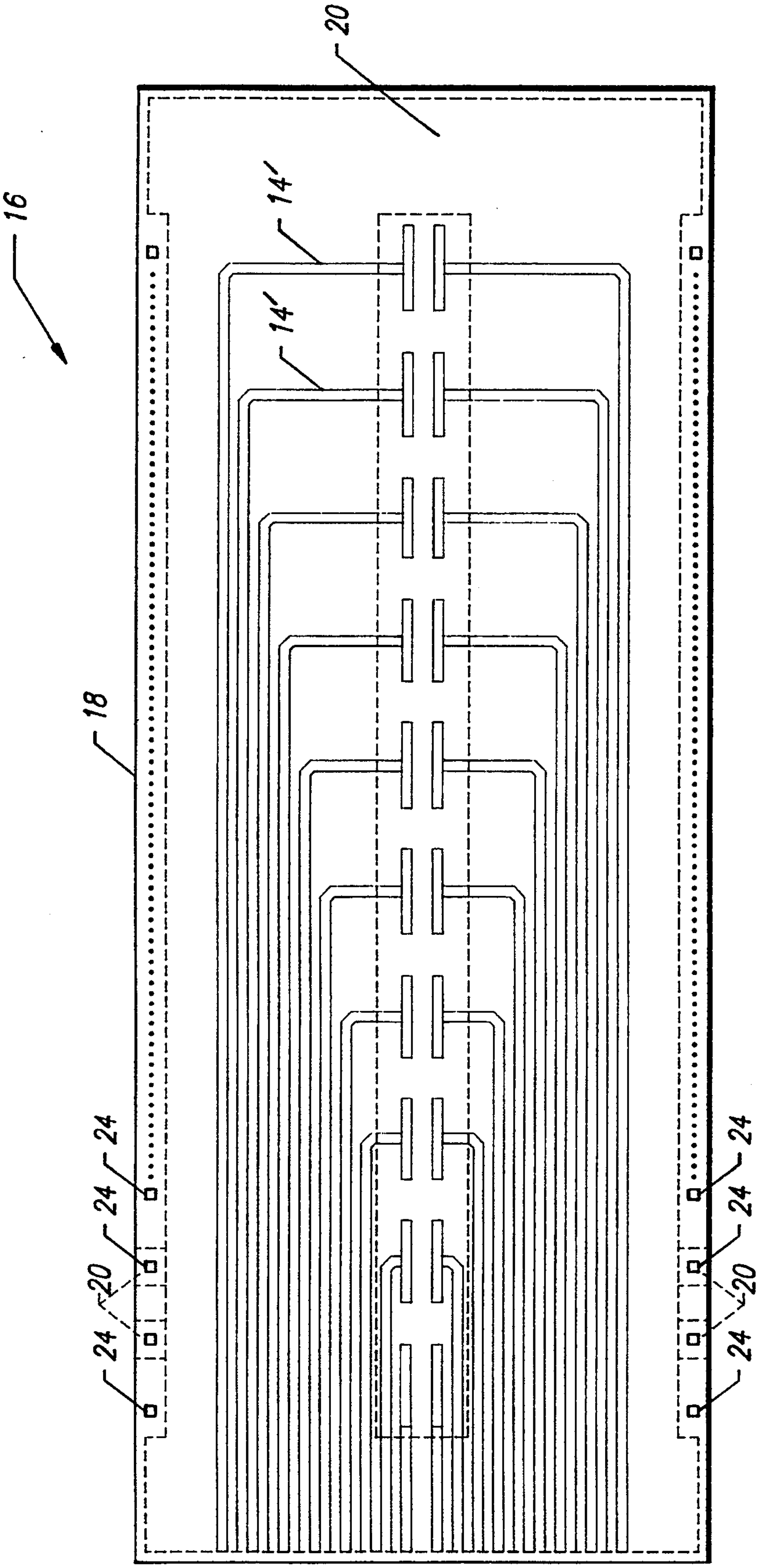
FIG. 2 is a top plan view of a die which comprises a pre-configured layer for accepting the portion of the tab circuit layout of FIG. 1, with FIG. 2 shown somewhat enlarged compared to FIG. 1.
Figure 3A:
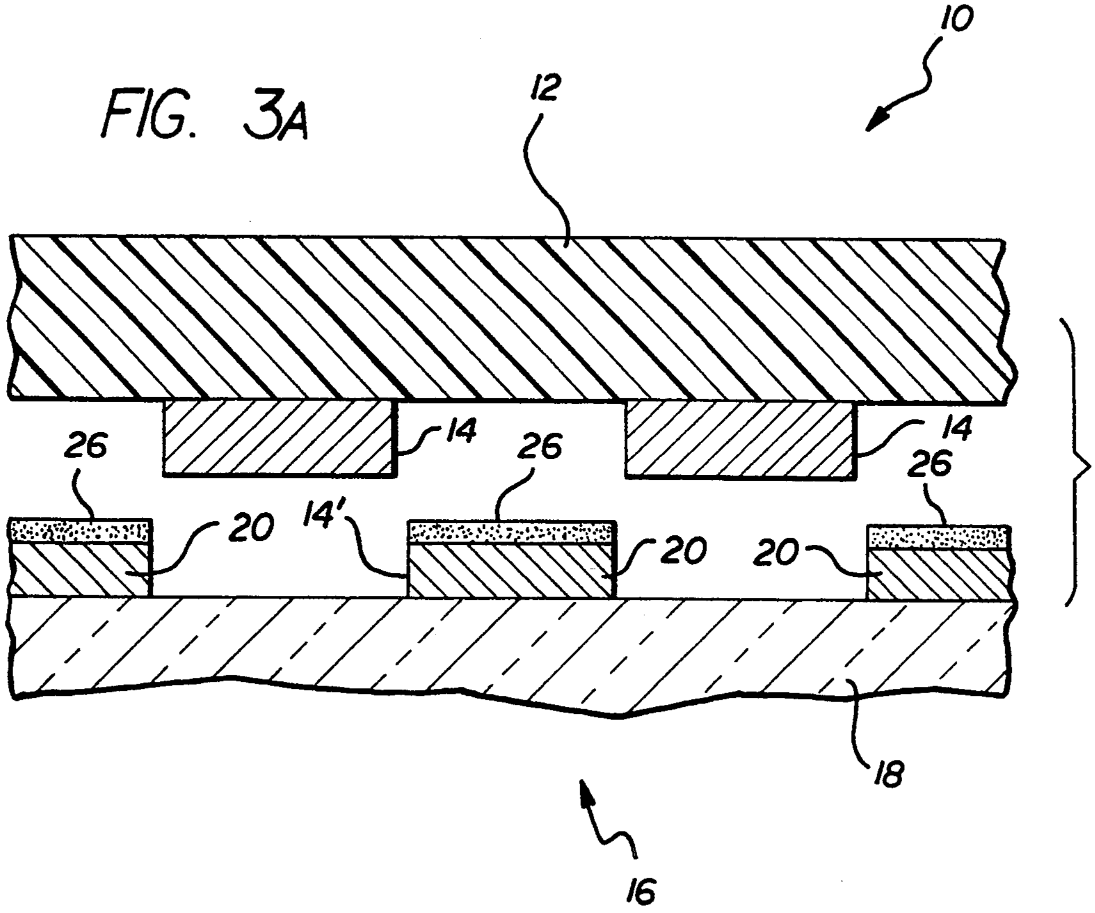
Figure 4A:
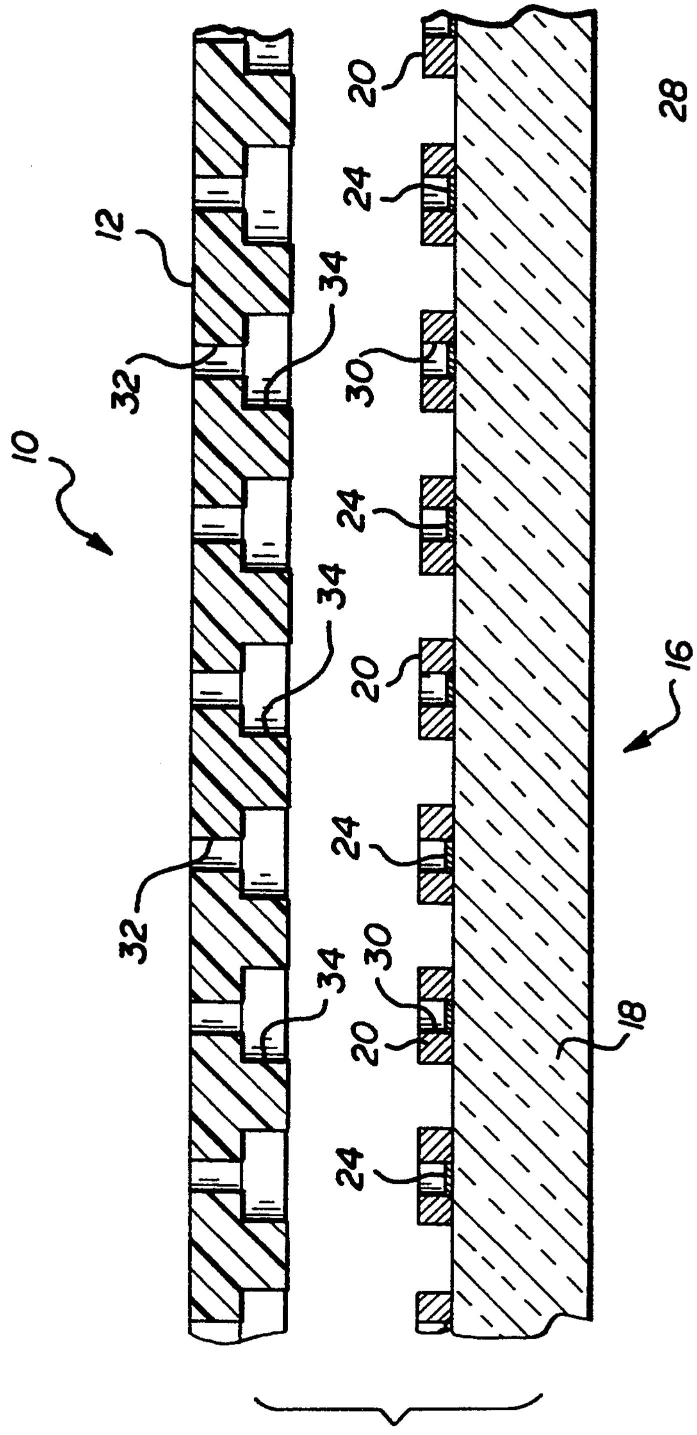
Figures 5A, 5B:
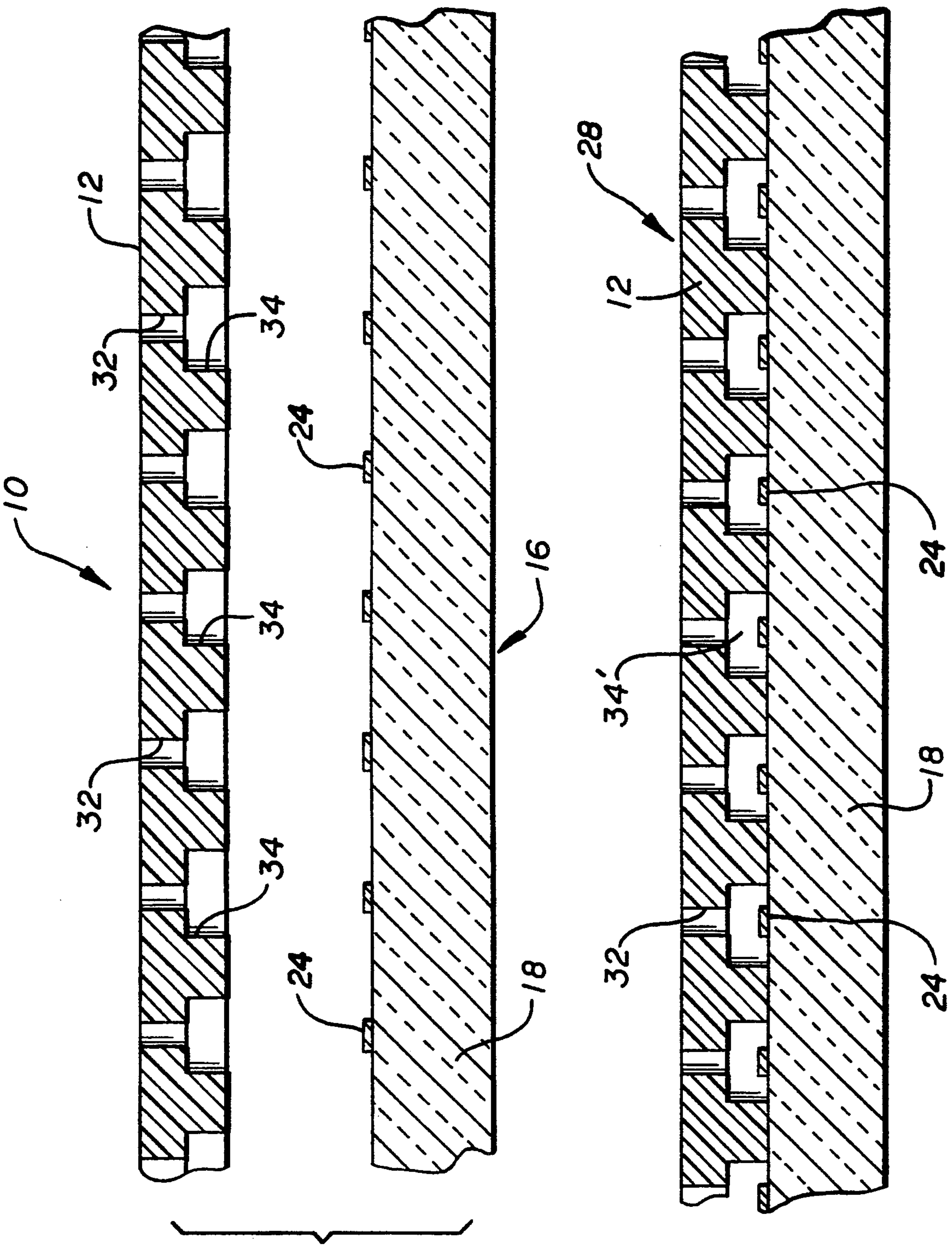

FIG. **3*a* is a cross-sectional view of the portion of the tab circuit layout and the die prior to lamination, taken along the line 3—3 of FIGS. 1 and 2**;

FIG. **3*b* is a view similar to that of FIG. 3*a*,** but after lamination in accordance with the invention;

FIG. **4*a* is a cross-sectional view of the portion of the TAB circuit layout and the die prior to lamination, taken along the line 4—4 of FIGS. 1 and 2**;

FIG. **4*b* is a view similar to that of FIG. 4*a*,** but after lamination in accordance with the invention;

FIG. **5*a* is a cross-sectional view of an alternative embodiment to that depicted in FIG. 4*a*, taken along the line 4—4 of FIGS. 1 and 2; and FIG. 5*b* is a view similar to that of FIG. 5*a*,** but after lamination in accordance with the invention.

BEST MODES FOR CARRYING OUT THE INVENTION

A means of aligning the orifi with the firing resistors of perpendicular jetting thermal ink-jet printhead ("roof shooter" or "top shooter" configuration) is described below in conjunction with the drawings. The primary elements are the thin film resistors and barriers forming ink channels on a silicon die, and the orifice plate which has resistor-sized nozzles which are laser drilled into a polyimide sheet. This sheet may have ink channels machined into the structure and also serves as the electrical interconnect to the printhead.

Two specific embodiments are described, but the concept of utilizing photodefinable features in or on both the silicon substrate and orifice plate for the purpose of accurate and fast alignment is taught. The raised barrier on the silicon is currently utilized for channeling the ink to the resistors, and additional features will be patterned which will interlock with either raised features (conductor traces), or laser machined depressions in the polyimide orifice plate. This interlocking will occur during printhead fabrication when the two components are joined to form the firing chamber.

FIG. 1 shows a portion of a TAB (tape automated bonding) circuit layout 10, comprising a substrate 12 on which are supported a plurality of conductive traces 14. A portion of the circuit layout 10, outlined in dashed lines and called the die outline, is to be interlocked into the barrier pattern, shown in FIG. 2. FIGS. 1 and 2 are shown in different scales. Essentially, FIG. 2 illustrates that portion which mates with the die outline FIG. 2 shows a portion of the die layout 16, which is etched in a pattern 14' to accept the pattern of conductive traces 14 from the TAB circuit. The die layout comprises a substrate 18, on which is formed a layer of a barrier material 20. The substrate 18 commonly comprises silicon, while the barrier material 20 comprises a photopolymerizable polymer, which is easily processed by conventional photolithographic techniques.

The formation of the etched pattern 14' in the barrier layer 20 is accomplished by conventional photolithographic techniques of masking portions of the barrier layer, exposing to a source of light (visible to UV), and developing the unwanted portions in a suitable solvent to remove them.

Also shown in FIG. 2 are a plurality of resistors 24. The resistors 24 are spaced apart in such a way as to line up with nozzles 32 and ink channels 34, described more fully below in connection with FIGS. 4 and 5, formed on the die 15 of FIG. 1. For clarity, electrical connections to the individual resistors 24 are omitted; these are well-known in the art and do not form a part of this invention.

Figure 3B:
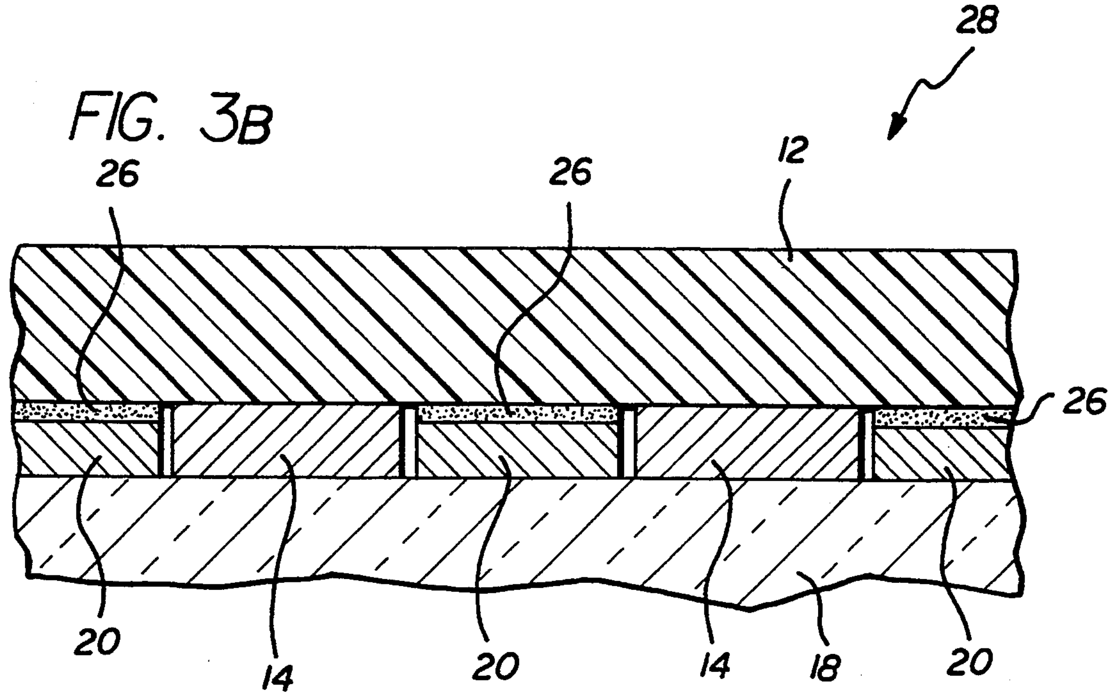

FIG. 3*a* and 3*b* depict the operation of laminating the TAB circuit layout 10 to the die layout 16 to provide a printhead assembly 28. An adhesive 26 on top of the barrier layer 20 secures the two layouts 10, 16. Advantageously, the adhesive is a pressure-sensitive adhesive, requiring a pressure of about 20 to 30 psi (1.41 to 2.11 Kg/cm$^2$) to form a suitable bond.

Figure 4B:
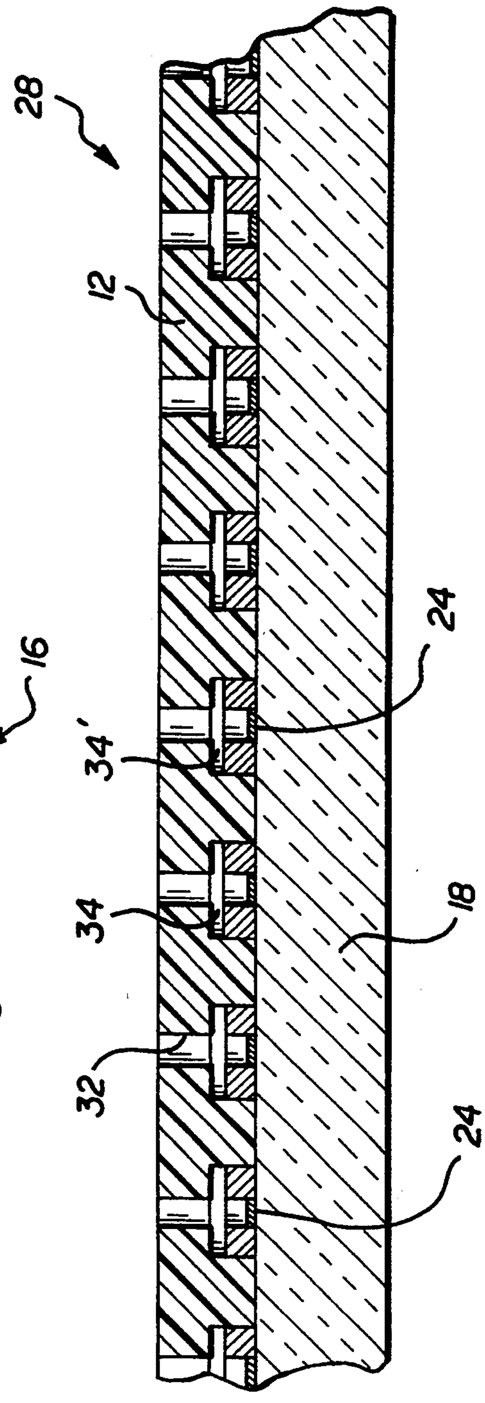

FIG. 4*a* and 4*b* depict another portion of the TAB circuit layout 10/die layout 16 combination. Resistors 24 are shown formed in a well 30 of barrier material 20. The well 30 is also called the firing chamber.

In this portion of the combination, nozzles 32 and ink channels 34 are formed, such as by laser burnout. Advantageously, the substrate 12 of the TAB circuit layout 10 comprises a polyimide, such as KAPTON, available from du Pont. An excimer laser, in conjunction with an appropriate mask, can be employed to burn out first the nozzles 32 and then the ink channels 34. The ink channels 34 are recessed sufficiently in the substrate 12 so as to leave an airgap 34', as seen in FIG. 4*b*. The airgap 34' is the path along which ink (not shown) is introduced from an ink supply (not shown) to the resistor 24, where it is selectively expelled through the nozzle 32 to form a bubble of ink. As is well-known for thermal ink-jet printers, application of a voltage to the resistor 24 energizes it and heats the surrounding ink, to thereby form the bubble.

FIG. 5 depicts an alternate embodiment to FIG. 4, in the barrier layer 20 around the individual resistors 24 is omitted. In this case, the openings 34' in the barrier layer 12 serve as the ink channels. In this connection, FIG. 2 depicts this embodiment, in which the resistors 24 are not surrounded by the barrier material 20, the boundaries of which are shown by the dashed line. However, the embodiment depicted in FIG. 4 is also shown for some resistors 24, in which the barrier material 20 is shown surrounding the resistors.

In assembling the parts, the barrier layer 20 is formed on the silicon substrate 18 and is patterned, using a conventional process as described elsewhere. However, additional channels 14' are developed, which allow the metal, here, copper, traces 14 on the flex circuit 10 to sit down to the silicon substrate 18. Next, the copper trace mask used for manufacturing the flex circuit is used as the pattern for the interior portions of the barrier mask. Consequently, only rough alignment is required as the two pieces 10, 16 are brought into contact and "locked" in place. Finally, a conventional lamination process is employed to bond the flex circuit to the barrier layer, using an adhesive 26. No bonding of the copper traces 14 to silicon 18 is necessary.

INDUSTRIAL APPLICABILITY

The method of aligning and bonding is expected to find use in thermal ink-jet printers.

Thus, there has been disclosed a method of self-aligning orifi and resistors in thermal ink-jet pens for improved construction of printheads. It will be apparent that various changes and modifications of an obvious nature may be made, and all such changes and modifications are considered to fall within the scope of the invention, as defined by the appended claims.

What is claimed is:

1. A method for assembling thermal ink-jet printheads, comprising:

(a) providing a circuit layout comprising a first substrate, a plurality of conductive traces thereon in a pre-selected pattern, and a plurality of openings through the substrate defining ink-jet nozzles;

(b) providing a die layout comprising (1) a barrier material comprising a photopolymerizable material, (2) a plurality of resistors, each resistor formed on a second substrate in a well defined by a wall of the barrier material and matched to one of the openings, and (3) a plurality of channels formed in the barrier material and matched to a portion of the plurality of conductive traces;

(c) interlocking the plurality of conductive traces with the plurality of channels to align each resistor of the plurality of resistors with a respective one of the openings; and (d) laminating those portions of the first substrate that contact the barrier material to the barrier material so as to bond the two layouts together.

2. The method of claim 1 wherein the laminating is done by first coating those portions of the barrier material defining the plurality of channels with a pressure-sensitive adhesive prior to the assembling.

3. The method of claim 2 wherein the laminating is accomplished by applying pressure of about 20 to 30 psi (1.41 to 2.11 Kg/cm$^2$) to the two layouts to form a suitable bond.

4. A method for assembling thermal ink-jet printheads, comprising:

(a) providing a circuit layout comprising a first substrate, a plurality of conductive traces thereon in a pre-selected pattern, and a plurality of openings through the substrate defining ink-jet nozzles;

(b) providing a die layout comprising (1) a barrier material comprising a photopolymerizable material, (2) a plurality of resistors, each resistor formed on a second substrate and matched to one of the openings, and (3) a plurality of channels formed in the barrier material and matched to a portion of the plurality of conductive traces;

(c) interlocking the plurality of conductive traces with the plurality of channels to align each resistor of the plurality of resistors with respective one of the openings; and (d) laminating those portions of the first substrate that contact the barrier material to the barrier material so as to bond the two layouts together.

5. The method of claim 4 wherein the laminating is done by first coating those portions of the barrier material defining the plurality of channels with a pressure-sensitive adhesive prior to the assembling.

6. The method of claim 5 wherein the laminating is accomplished by applying pressure of about 20 to 30 psi (1.41 to 2.11 Kg/cm$^2$) to the two layouts to form a suitable bond.

* * * * *